Oct. 6, 1925.
A. G. RIPBERGER
SYSTEM FOR DISPOSING OF METAL CUTTINGS
Filed March 23, 1925  3 Sheets-Sheet 1
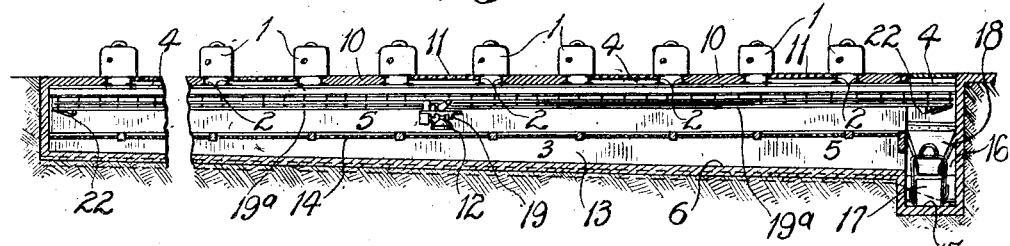
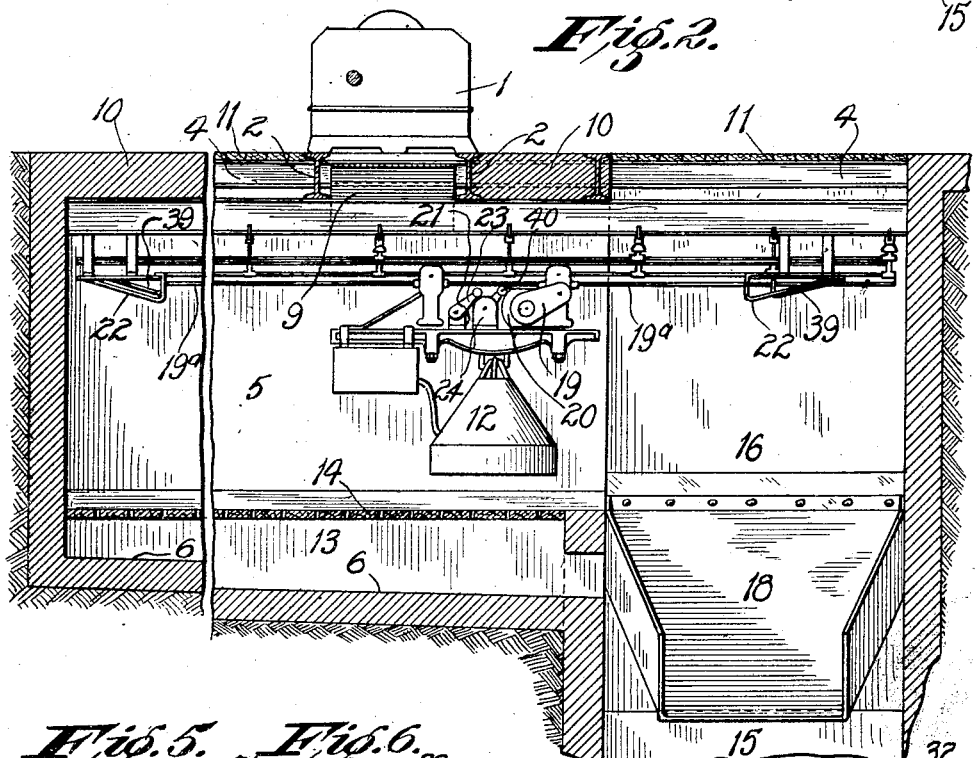
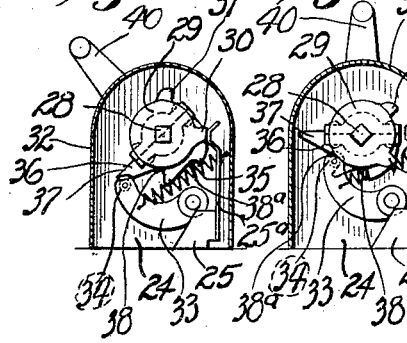
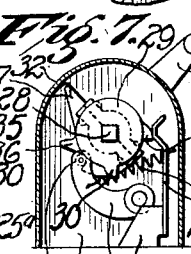
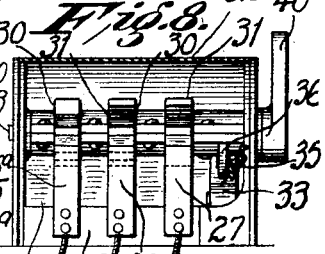

Oct. 6, 1925.  
A. G. RIPBERGER  
1,556,161
SYSTEM FOR DISPOSING OF METAL CUTTINGS
Filed March 23, 1925  3 Sheets-Sheet 2
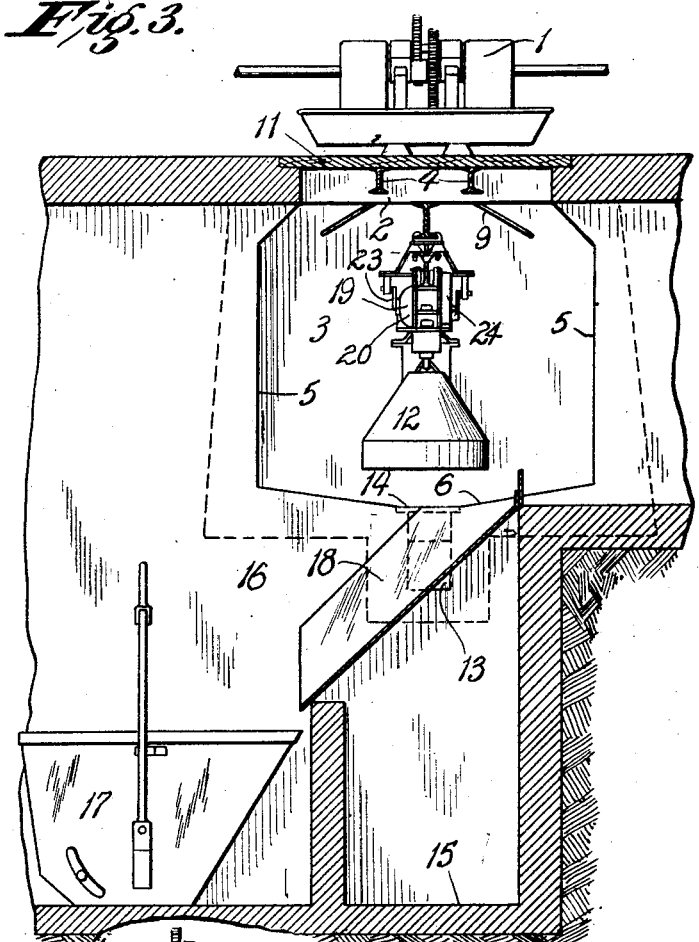
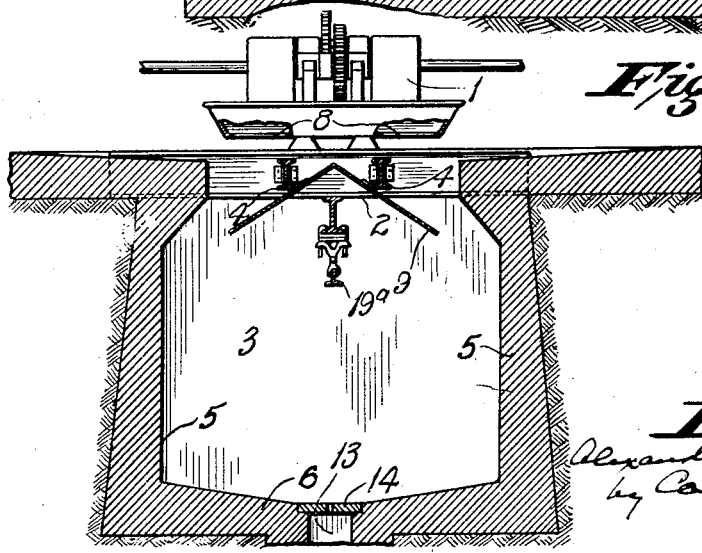
Inventor:
Alexander G. Ripberger
by his Attorneys

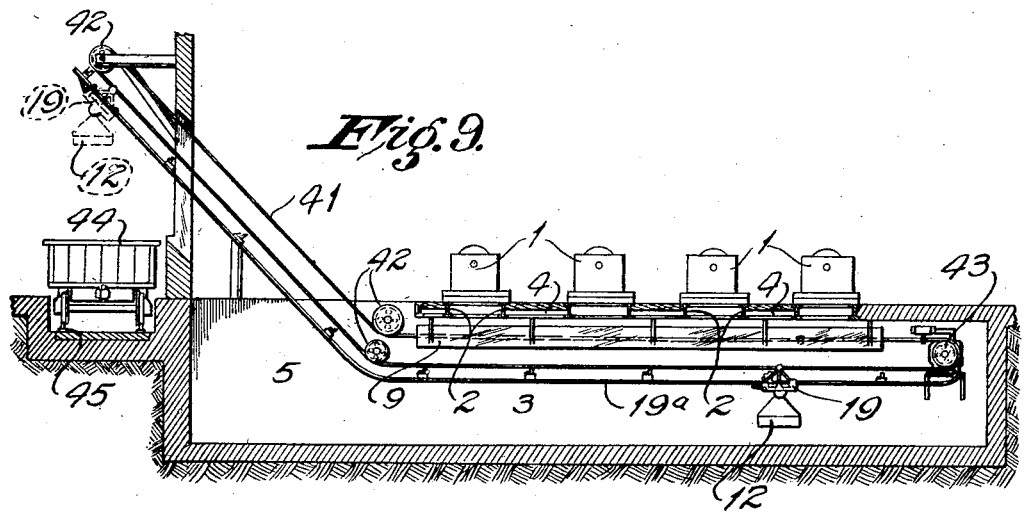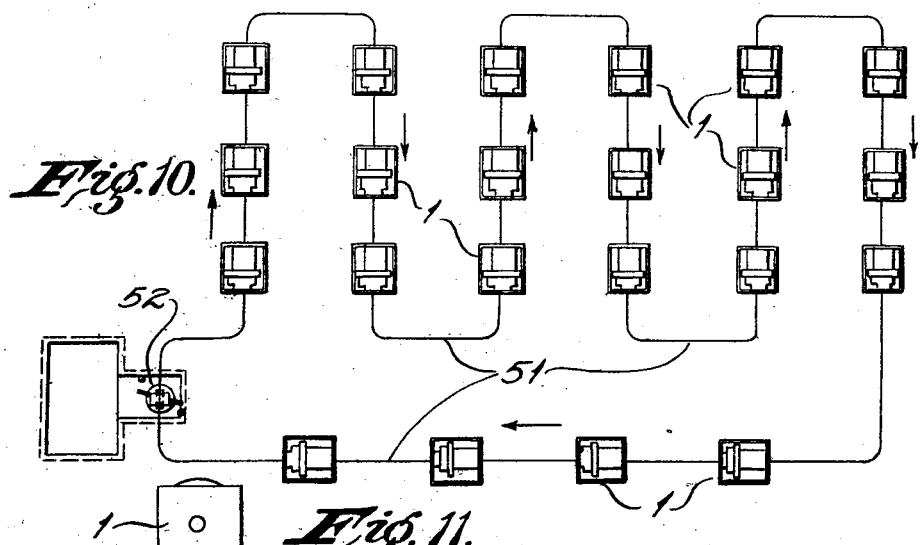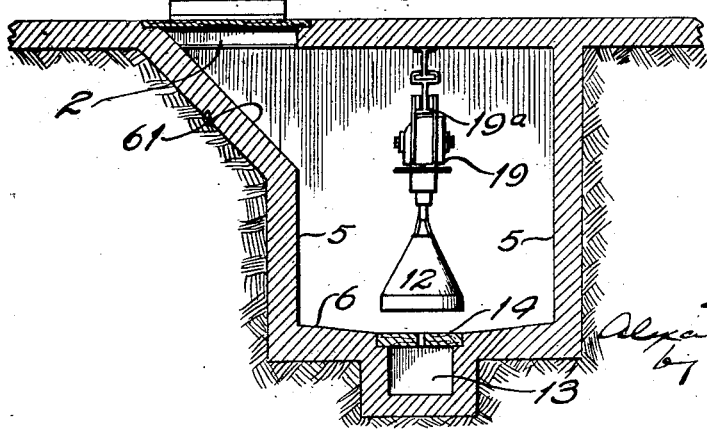

Patented Oct. 6, 1925.

1,556,161

UNITED STATES PATENT OFFICE.

ALEXANDER G. RIPBERGER, OF CANTON, OHIO, ASSIGNOR TO THE TIMKEN ROLLER BEARING COMPANY, OF CANTON, OHIO, A CORPORATION OF OHIO.

SYSTEM FOR DISPOSING OF METAL CUTTINGS.

Application filed March 23, 1925. Serial No. 17,626.

*To all whom it may concern:*

Be it known that I, ALEXANDER G. RIPBERGER, a citizen of the United States, and a resident of the city of Canton, in the county of Stark and State of Ohio, have invented a new and useful Improvement in Systems for Disposing of Metal Cuttings, of which the following is a specification.

My invention relates to systems of handling metal cuttings particularly adapted for use in collecting and carrying away the metal scraps produced by automatic screw machines and the like; and has for its principal object a device that will automatically collect such scraps from a number of machines and carry them to a dumping pit.

The invention consists principally in disposing a plurality of screw machines or the like along a trough or tunnel into which cuttings produced by the machines drop and mounting an electromagnet so as to traverse said trough, pick up the scraps under the several machines and dump them into a suitable dumping pit or receptacle. My invention further consists in the system, mechanism and parts and combinations of parts hereinafter described and claimed.

In the accompanying drawings which form part of this specification and wherein like reference numerals indicate like parts in the several views, Fig. 1 is a longitudinal sectional view of a scrap handling system and apparatus embodying my invention, Fig. 2 is a longitudinal sectional view similar to Fig. 1, but on an enlarged scale, illustrating the dumping end of the system, Fig. 3 is an end view, the dumping pit being shown in section, Fig. 4 is a vertical sectional view of the tunnel or trough, Figs. 5, 6 and 7 are sectional views of the reversing switch for controlling the current through the electromagnet, said views showing the switch in its three different positions, Fig. 8 is a side elevation of said switch, the outer casing being broken away, Fig. 9 is a sectional view similar to Fig. 1, of a modified form of the invention, Fig. 10 is a diagrammatic view of a modified system, and Fig. 11 is a sectional view similar to Fig. 4 in which the machines are placed at the side of the tunnel instead of directly over it.

A series of automatic screw machines 1 or lathes or the like are mounted on I-beams 2 or other suitable supports arranged along a trough or tunnel 3. Smaller I-beams 4 extend between the I-beams 2 that support the machines 1. The sides 5 and floors 6 of the tunnel are preferably lined with concrete and the floor slopes from each side toward the center. Each machine is provided with an apron or shield into which the cuttings from the machines drop. Each apron is provided with openings 8 so that cuttings, shavings or scraps resulting from the operation of the machine drop into the tunnel 3. A suitable shield 9 is suspended from the I-beams 4 under each machine and deflects the cuttings from the conveyer mechanism hereinafter described. Portions of the floor over the tunnel may be of concrete 10 and other portions of boards 11 to permit easy access to the tunnel.

Preferably the tunnel 3 is provided with a floor that slopes from the sides to the center so that the scraps and chips from the machines are collected in the center of the tunnel where they may be easily picked up by an electromagnet 12 or other conveyer device. The tunnel is provided with a drain 13 that is protected by a suitable perforated cover 14 so that any cutting compound that falls into the tunnel with the metal scraps will pass through the holes in the cover 14 and fall into the drain 13 whence it flows to the end of the tunnel and is collected in a suitable pit or receptacle 15. At one end of the tunnel is a dumping pit 16 in which may be disposed a suitable receptacle 17 for collecting the metal cuttings and an inclined chute 18 may be provided for receiving them as they fall from the electromagnet 12 and delivering them to the receptacle 17.

Mounted to travel back and forth through the tunnel is the electromagnet 12 that is suspended from a suitable carrier 19 that is mounted to travel along a trackway 19$^a$ extending the length of the tunnel.

The carrier 19 is preferably operated by an electric motor 20 and a control switch 21 is provided therefor. This switch 21 is automatically operated by stops 22 at the ends of the trackway, so that when the carrier reaches one end of the trackway the arm 23 of the motor control switch strikes a stop 22, thus reversing the current through the motor 20 and causing the carrier 19 to travel in the opposite direction.

The electromagnet 12 is controlled by a switch 24 that has three operative positions, such that as the carrier travels through the tunnel 3 toward the dumping pit electric current is passed through the electromagnet 12 to energize it; when the carrier reaches the dumping station, the current through the electromagnet is momentarily reversed, thus causing the cuttings carried by the magnet to be quickly demagnetized and dumped, and the current is then shut off; and when the carrier is traveling away from the dumping pit, no current passes through the electromagnet and no cuttings are collected.

A suitable switch for this purpose is shown in Figs. 5, 6, 7 and 8. Secured to the base 25 of the switch mechanism are three contact pieces 25$^a$, 26, 27 one of which (26) receives current from a suitable source of energy. Mounted on a rotatable shaft 28 is a conductor member 29 that has a pair of contact points 30 adapted to contact with said contact piece 26 and said contact piece 27 respectively. Thus the direction of the current flowing through said switch may be changed by bringing one or the other pair of contact points 30 or 31 into operative position and the current may be shut off by turning said shaft into a position where neither pair of contact points is in operative position.

Pivotally mounted in the switch housing 32 is an arm 33 that has a roller 34 at the end thereof. The arm 33 is connected to the housing 32 by means of a spring 35. The shaft 28 has a cam disk 36 that has an elongated cam portion 37 and spaced recesses 38 and 38$^a$ that are adapted to cooperate with the roller on the end of the arm. When the elongated cam portion 37 of the cam disk 36 is in contact with the roller 34 of the arm 33 it forces said arm downwardly against the resistance of the spring 35 and as soon as the force moving said cam disk is released the spring forces the arm back into its neutral position, where the roller rests in the recess 38 of the disk. When the cam arm 37 is in contact with the cam roller 34 the switch is in position to set up a reverse current through the electromagnet and from this position the switch moves into neutral position, with the roller 34 of the arm resting in a recess 38. In this position the cam disk 36 is yieldably held against rotation since the roller is held in the recess by the force of the spring 35 and the cam disk can only be rotated by a force sufficient to overcome said spring. When the switch is in position for the current to pass through the electromagnet in the normal direction, the cam disk is likewise yieldably held in position by reason of the roller 34 resting in the other recess 38$^a$ and the parts being held by the spring 35.

Mounted at the dumping end of the track 19$^a$ is an abutment 39 for operating an arm 40 of the shaft 28. As the carrier 19 travels toward the dumping station, the switch mechanism 24 is in the position shown in Fig. 7, and a current is flowing through the electromagnet to energize it and cause it to pick up metal cuttings from the floor of the tunnel. The shaft arm 40 strikes this abutment 39 before the motor controlling switch arm 23 strikes its abutment 22; and thus the switch mechanism is thrown from the position shown in Fig. 7 through the neutral position shown in Fig. 6 and to the reverse position shown in Fig. 5 in which the elongated cam portion 37 of the cam disk 36 presses the roller arm 33 downwardly, and a reverse current flows through the electromagnet causing the metal cuttings carried thereby to be demagnetized quickly and drop. When the carrier reverses its direction of travel and the electromagnet is carried away from the dumping station, the spring 35 causes the arm 33 to swing upwardly rotating the cam disk 36 and bringing the switch mechanism into the neutral position shown in Fig. 6 where no current passes through the electromagnet. At the end of the tunnel away from the dumping pit, the magnet switch arm 40 strikes the abutment 39 and is thrown into the position shown in Fig. 7, so that the electromagnet is energized, and the motor switch arm 21 strikes the abutment 22, thus reversing the current through the motor and causing it to travel toward the dumping pit again.

In the system shown in Fig. 9 a cable 41 is provided for driving the electromagnet, said cable passing over suitable pulley wheels 42 and being driven by an electric motor 43 or other suitable source of power. The cable travels upwardly and a dump car 44 is placed on a track 45 beneath the dumping station. The current through the electromagnet is momentarily reversed and then shut off at the dumping station, as above described, the direction of travel of the cable is reversed and the electromagnet carried back through the tunnel and the current again turned on through the electromagnet and the direction of travel of the cable reversed.

Fig. 10 is a diagrammatic view that shows the layout of a system in which a single electromagnet collects the cuttings from a large number of machines. The magnet is arranged to pass underneath all of the machines, the path of travel being indicated by the arrows and 51 indicating the trackway. A dumping station 52 is provided where the current through the electromagnet is momentarily reversed and then shut off. The current is turned on again before the magnet reaches the first machine. The magnet travels continuously on direct drive through a closed path.

In the construction shown in Fig. 11, the machines are placed to the side of the tunnel, instead of directly over it, and the tunnel is provided with a sloping side wall 61 onto which the cuttings drop.

The herein described system has numerous advantages. It automatically removes the metal cuttings from a series of machines and collects them in a pit where they may easily be removed. It is adapted for removing scraps and chips, or finished articles. The cutting compound is drained away from the metal cuttings and collected and may be used over and over. It avoids cluttering up the factory floor with receptacles for cuttings.

Obviously, my invention can be embodied in different forms from the one herein described and various forms of mechanism may be used, and I do not wish to be limited to the precise construction shown.

What I claim is:

1. The combination with a chamber of a metal cutting machine arranged to deliver its metal cuttings into said chamber, and travelling means in said chamber for collecting and removing said cuttings.

2. The combination with a chamber of a metal cutting machine arranged to deliver its metal cuttings into said chamber, and a travelling electromagnet mounted to travel through said chamber to collect and remove cuttings from said machine.

3. The combination with a chamber of a metal cutting machine arranged to deliver its metal cuttings into said chamber, an electromagnet mounted to travel through said chamber, a dumping station, and means for normally energizing said electromagnet and for deenergizing said electromagnet at said dumping station, whereby said electromagnet collects cuttings from said machine carries them to said dumping station and deposits them.

4. The combination with a tunnel of a series of metal cutting machines located above said tunnel and arranged to deliver their metal cuttings into said tunnel and means in said tunnel for collecting and removing said cuttings.

5. The combination with a tunnel of a series of metal cutting machines arranged to deliver into said tunnel their metal cuttings and cutting compound used in the work of the machine, means in said tunnel for collecting and removing said cuttings, and a drain for collecting said cutting compound that falls into the tunnel with said metal cuttings.

6. A system for collecting metal cuttings comprising a tunnel, a series of metal cutting machines located above said tunnel, and arranged to deliver their metal cuttings into said tunnel, an electromagnet mounted to travel through said tunnel and a dumping pit for receiving cuttings from said electromagnet.

7. The combination with a tunnel of a series of metal cutting machines arranged to deliver their metal cuttings into the same, of a trackway in said tunnel, a carrier mounted to travel on said trackway, means for propelling said carrier, a dumping station and means supported by said carrier for collecting said metal cuttings and depositing them at said dumping station.

8. The combination with a tunnel of a series of metal cutting machines located above said tunnel and arranged to deliver their metal cuttings into said tunnel, a trackway extending lengthwise of said tunnel, a carrier mounted to travel back and forth on said trackway, means for propelling said carrier, means at the ends of the trackway for reversing the travel of said carrier and means supported by said carrier for collecting said metal cuttings and depositing them at one end of the tunnel.

9. The combination with a tunnel of a series of metal cutting machines located above said tunnel and arranged to deliver their metal cuttings into said tunnel, a trackway extending lengthwise of said tunnel, a carrier mounted to travel back and forth on said trackway, means for propelling said carrier, means at the ends of the trackway for reversing the travel of said carrier, means supported by said carrier for collecting said metal cuttings and depositing them at one end of the tunnel, and means for preventing said collecting means from collecting cuttings when it is moving away from the depositing end of the tunnel.

10. The combination with a tunnel of a series of metal cutting machines located above said tunnel and arranged to deliver their metal cuttings into said tunnel, a trackway extending lengthwise of said tunnel, a carrier mounted to travel back and forth on said trackway, means for propelling said carrier, means at the ends of the trackway for reversing the travel of said carrier and an electromagnet supported by said carrier for collecting said metal cuttings and depositing them at one end of the tunnel.

11. A system for collecting metal cuttings, comprising a tunnel, a series of metal cutting machines located above said tunnel and arranged to deliver their metal cuttings into said tunnel, an electromagnet mounted to travel back and forth in said tunnel, a dumping pit at the end of the tunnel, means for permitting electric current to flow through the electromagnet as it travels toward the dumping pit and shutting off said current as the electromagnet travels away from the dumping pit.

12. A system for collecting metal cuttings comprising a chamber, a series of metal cutting machines, arranged to deliver their metal cuttings into the same, an electromagnet mounted to travel through said chamber, a dumping station, and means for normally energizing said electromagnet and for deenergizing it at said dumping station, whereby said electromagnet collects cuttings from said machine and deposits them at said dumping station.

13. A system for collecting metal cuttings comprising a tunnel, a series of metal cutting machines located above said tunnel and arranged to deliver their metal cuttings into said tunnel, an electromagnet mounted to travel back and forth in said tunnel, a dumping pit at the end of the tunnel, means for permitting electric current to flow through the electro-magnet as it travels toward the dumping pit, reversing the current when the electromagnet is at the dumping station and shutting off said current as the electromagnet travels away from the dumping pit.

14. The combination with a tunnel having a transversely sloping floor of a series of metal cutting machines arranged to deliver their metal cuttings into said tunnel, a trackway extending lengthwise of said tunnel above the low portion thereof, a dumping station, and means adapted and arranged to travel along said trackway for collecting said metal cuttings and depositing them at said dumping station.

15. The combination with a tunnel having a transversely sloping floor of a series of metal cutting machines arranged to deliver their metal cuttings into said tunnel, a trackway extending lengthwise of said tunnel above the low portion thereof, a dumping station, and an electromagnet adapted and arranged to travel along said trackway and means for normally energizing said electromagnet and for deenergizing it at said dumping station.

16. The combination with a tunnel whose floor slopes from the sides toward the middle of a series of metal cutting machines located above said tunnel and arranged to deliver their metal cuttings into said tunnel, a trackway extending lengthwise of said tunnel along the middle thereof, a carrier mounted to travel back and forth on said trackway, means for moving said carrier, means at the ends of the trackway for reversing the travel of said carrier and means supported by said carrier for collecting said metal cuttings and depositing them at one end of the tunnel.

17. The combination with a tunnel whose floor slopes from the sides toward the middle of a series of metal cutting machines located above said tunnel and arranged to deliver their metal cuttings into said tunnel, a trackway extending lengthwise of said tunnel along the middle thereof, a carrier mounted to travel back and forth on said trackway, means for reversing the travel of said carrier, means supported by said carrier for collecting said metal cuttings and depositing them at one end of the tunnel, and shields beneath said machines for deflecting the metal cuttings from the trackway and collecting device.

18. A system for collecting metal cuttings comprising a tunnel, a series of metal cutting machines located above said tunnel and arranged to deliver their metal cuttings into said tunnel, an electromagnet mounted to travel back and forth in said tunnel, a dumping pit at the end of the tunnel, a switch for controlling the current through said electromagnet, and means for operating said switch so that current flows through the electromagnet while it travels toward the dumping pit and the current is shut off while the electromagnet is traveling away from the dumping pit.

19. A system for collecting metal cuttings comprising a tunnel, a series of metal cutting machines located above said tunnel and arranged to deliver their metal cuttings into said tunnel, an electromagnet mounted to travel back and forth in said tunnel, a dumping pit at the end of the tunnel, a switch for controlling the current through said electromagnet, and means for operating said switch so that current flows through the electromagnet while it travels toward the dumping pit, the current is reversed when the electromagnet is at the dumping pit and the current is shut off while the electromagnet is traveling away from the dumping pit.

20. A system for collecting metal cuttings comprising a tunnel, a series of metal cutting machines located above said tunnel and arranged to deliver their metal cuttings into said tunnel, an electromagnet mounted to travel back and forth in said tunnel, a dumping pit at the end of the tunnel, a switch for controlling the current through said electromagnet, said switch having an operating arm, an abutment at the opposite end of the trackway from said dumping pit for moving said operating arm so that electric current may pass through the electromagnet and an abutment at the dumping end of the trackway for moving said operating arm to reverse the electric current through said electromagnet and said switch embodying means for bringing its mechanism into neutral position when the electromagnet moves away from the dumping pit.

Signed at Canton, Ohio, this 18" day of March, 1925.

ALEXANDER G. RIPBERGER.